(12) United States Patent
Nakano et al.

(10) Patent No.: US 8,819,905 B2
(45) Date of Patent: Sep. 2, 2014

(54) MACHINING CENTER

(75) Inventors: Hideki Nakano, Obu (JP); Yoshiaki Sawada, Nagoya (JP); Koichi Kawamura, Matsudo (JP)

(73) Assignee: Yamazaki Mazak Corporation, Aichi (JP)

( * ) Notice: Subject to any disclaimer, the term of this patent is extended or adjusted under 35 U.S.C. 154(b) by 0 days.

(21) Appl. No.: 14/125,762

(22) PCT Filed: Jun. 15, 2012

(86) PCT No.: PCT/JP2012/065359
§ 371 (c)(1),
(2), (4) Date: Dec. 12, 2013

(87) PCT Pub. No.: WO2013/186915
PCT Pub. Date: Dec. 19, 2013

(65) Prior Publication Data
US 2014/0178144 A1    Jun. 26, 2014

(51) Int. Cl.
*B23Q 7/00*    (2006.01)
*B23Q 1/66*    (2006.01)
*B23Q 11/08*   (2006.01)
*B23Q 39/02*   (2006.01)
*B23Q 7/14*    (2006.01)
*B23Q 1/01*    (2006.01)

(52) U.S. Cl.
CPC ............... *B23Q 1/66* (2013.01); *B23Q 39/029* (2013.01); *B65G 2201/0267* (2013.01); *B23Q 11/0891* (2013.01); *B23Q 7/1431* (2013.01); *B23Q 1/017* (2013.01)
USPC .......... 29/33 P; 198/346.1; 409/158; 409/134

(58) Field of Classification Search
USPC ..................... 29/33 P, 563; 198/346.1, 345.3; 409/158, 159, 134
See application file for complete search history.

(56) References Cited

U.S. PATENT DOCUMENTS 4,172,512 A * 10/1979 Clegg et al. ................ 198/346.1
4,449,277 A    5/1984 Hasegawa et al.
(Continued)

FOREIGN PATENT DOCUMENTS

DE    39 21 042 A1    12/1989
FR    2 513 162       3/1983
(Continued)

OTHER PUBLICATIONS

International Search Report for corresponding International Application No. PCT/JP2012/065359 mailed Sep. 18, 2012.

(Continued)

*Primary Examiner* — Erica E Cadugan
(74) *Attorney, Agent, or Firm* — Renner, Otto, Boisselle & Sklar, LLP

(57) ABSTRACT

The present invention provides a machining center that efficiently machines a long workpiece using two pallets. A machining center 1 includes a saddle 30 that moves in a Y axis direction on a bed 10, and a table unit 50 moves in an X axis direction on the saddle 30. At a right end and a left end of the front surface of the bed 10, setup stations 110 and 120 are respectively disposed. While a spindle head 80 is machining a workpiece $W_2$ with one pallet 140 placed on the table unit 50, a workpiece $W_1$ can be set up onto the other pallet 130. A long workpiece can also be machined on the two pallets 130 and 140 placed on the table unit 50.

6 Claims, 8 Drawing Sheets

(56) References Cited

U.S. PATENT DOCUMENTS

| | | | |
|---|---|---|---|
| 4,460,081 A * | 7/1984 | Stark et al. | 198/346.1 |
| 4,677,718 A * | 7/1987 | Babel | 29/33 P |
| 4,984,351 A * | 1/1991 | Matsuyama et al. | 29/33 P |
| 4,999,895 A * | 3/1991 | Hirose et al. | 29/33 P |
| 5,265,497 A * | 11/1993 | Curless | 29/33 P |
| 6,193,048 B1 * | 2/2001 | Keith | 198/346.1 |

FOREIGN PATENT DOCUMENTS

| | | |
|---|---|---|
| JP | 61-109641 | 5/1986 |
| JP | 62-292340 A * | 12/1987 |
| JP | 63-062636 | 3/1988 |
| JP | 02-009545 | 1/1990 |
| JP | 11-058171 | 3/1999 |
| JP | 2003-326431 | 11/2003 |
| JP | 2009-072902 | 4/2009 |

OTHER PUBLICATIONS

Form PCT/ISA/237 for corresponding International Application No. PCT/JP2012/065359 dated Sep. 18, 2012.

Notification of Reasons for Refusal for corresponding Japanese Application No. 2012-552192 dated Apr. 23, 2013 and English translation.

Supplementary European Search Report for corresponding European Application No. EP12878636.5 dated May 12, 2014.

* cited by examiner

MACHINING CENTER

TECHNICAL FIELD

The present invention relates to a machining center that efficiently machines long workpieces using two pallets mounted on the machining center.

CONVENTIONAL ART

For example, Patent Document 1 specified below discloses a machine tool equipped with a plurality of pallets and a long table on which to machine a long workpiece.

RELATED ART DOCUMENTS

Patent Documents

Patent Document 1: Japanese Unexamined Patent Application Publication No. 2-9545.

SUMMARY OF THE INVENTION

Problems to be Solved by the Invention

Unfortunately, this machine tool is equipped with a plurality of pallets that replace each other for machining and a separate long table. This causes an inefficient situation in which either the former or the latter is unavailable when the other one of the former and the latter is in use. The replacement pallets and the long table are incorporated inside the machine with little or no consideration given to setup operability. Furthermore, the replacement pallets and the long table are arranged in series, which increases the machine width. Additionally, the configuration employed here is that the machining area for the long workpiece and the normal machining area for the pallet are independently fixed, and that the spindle is drivingly moved along all the three axes of X, Y, and Z. For the mechanism that drivingly moves the spindle, this necessitates not only consideration of rigidity but also consideration of, for example, the wiring of the control line and the power line and the piping of the hydraulic or pneumatic pipe, resulting in a complicated and large machine. Thus, it is an object of the present invention to provide a machining center that overcomes the above-described problems.

Means of Solving the Problems

In order to achieve the above-described object, a machining center according to the present invention includes a bed, a column disposed upright at a rear center portion of the bed, a table unit mounted on the bed and configured to move along an X axis and a Y axis orthogonal to the X axis on a horizontal surface, a spindle mounted at a front surface of the column and configured to move along a vertical Z axis, two pallets, two clamp units configured to mount the respective two pallets next to one another onto the table unit, a first setup station and a second setup station respectively disposed at a right end and a left end of a front surface of the bed, and means for moving the pallets between the table unit and the first and second setup stations. A space is defined between the first setup station and the second setup station, which are respectively disposed at the right end and the left end of the front surface of the bed. This space is where a long workpiece is set up onto the two pallets on the table unit. The machining center also includes doors respectively disposed at a front surface of the first setup station and a front surface of the second setup station so as to provide access to a first setup station area where the first setup station is disposed and to a second setup station area where the second setup station is disposed. The machining center also includes partition doors respectively configured to open and close the first setup station area and the second setup station area relative to a machining area where the table unit is disposed.

Effects of the Invention

The machining center according to the present invention includes two clamp units capable of mounting respective two pallets next to one another onto the table unit. The use of two pallets ensures machining of long workpieces that are infrequently machined, and eliminates the need for a wasteful, additional pallet dedicated to a long workpiece. Also, a sufficient amount of setup space is ensured, and this improves operability during setup. Additionally, while a workpiece is being machined with one pallet clamped on the table unit, the other pallet moves to its setup station to set up another workpiece, which improves productivity.

MODES FOR CARRYING OUT THE INVENTION

Figure 1:
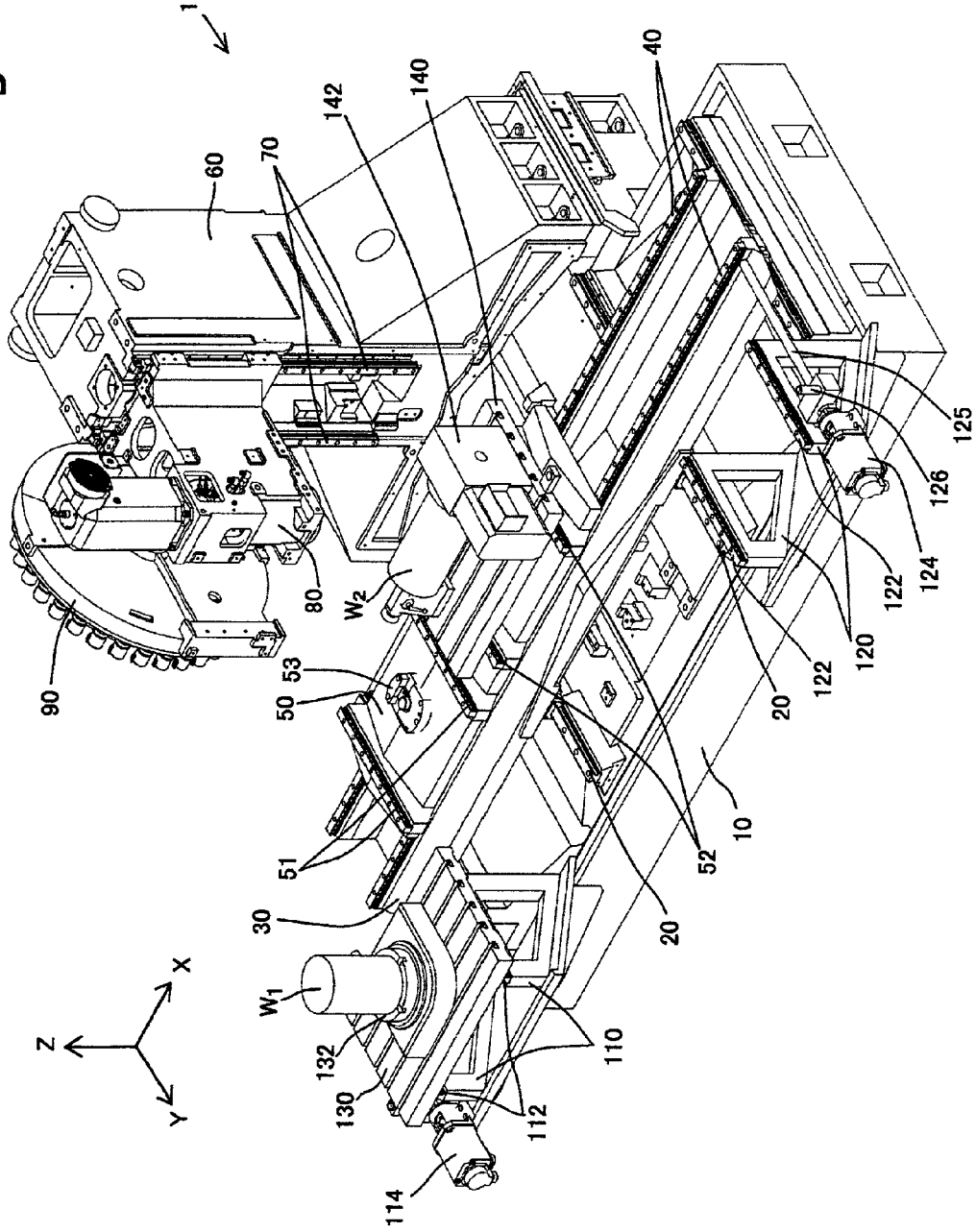
FIG. 1 is a perspective view of a machining center according to the present invention illustrating a machine configuration of the machining center.
Figure 2:
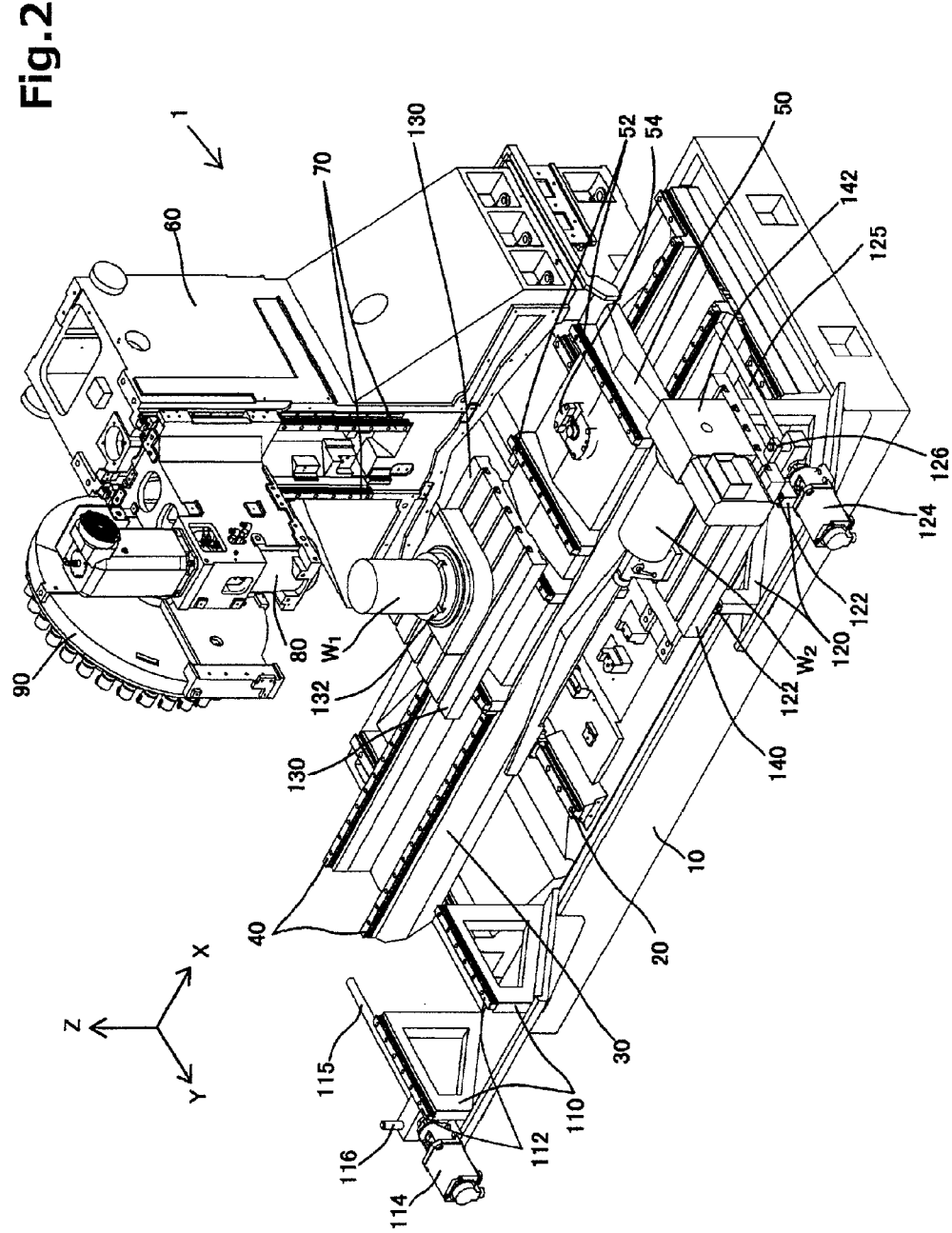
FIG. 2 is a perspective view of the machining center according to the present invention illustrating a machine configuration of the machining center.

FIGS. 1 and 2 are perspective views illustrating a machine configuration of the machining center according to the present invention. The machining center 1 includes a bed 10, and Y-axis linear guides 20 are mounted at a center portion of the bed 10. On the Y-axis linear guides 20, a saddle 30 is mounted. The saddle 30 is controlled to move in the Y axis direction. On the saddle 30, X-axis linear guides 40 are mounted. On the X-axis linear guides 40, a table unit 50 is mounted. The table unit 50 is controlled to move in the X axis direction along the X-axis linear guides 40. On the table unit 50, a pair of linear guides 51 and a pair of linear guides 52 are disposed in the Y axis direction.

On the bed 10, a column 60 is mounted facing the saddle 30. On the front surface of the column 60, Z-axis linear guides 70 are mounted to accept a spindle head 80. The spindle head 80 is controlled to move in the Z axis direction along the Z-axis linear guides 70. The spindle head 80 receives a suitable tool from a tool magazine 90 to machine a workpiece.

At a left portion of the front surface of the bed 10 as seen on the front, a first setup station 110 is disposed. The first setup station 110 includes linear guides 112 parallel to the Y axis, and a servo motor 114 is mounted at a side portion of the first setup station 110. The servo motor 114 drives a ball screw 115. To a nut of the ball screw 115, a pallet replacing hook 116 is mounted.

At a right portion of the front surface of the bed 10 as seen on the front, a second setup station 120 is disposed. The second setup station 120 includes linear guides 122 parallel to the Y axis, and a servo motor 124 is mounted at a side portion of the second setup station 120. The servo motor 124 drives a ball screw 125. To a nut of the ball screw 125, a pallet replacing hook 126 is mounted. Thus, two pallets are mounted on the bed 10.

FIG. 1 illustrates a state in which a first pallet 130 is placed on the first setup station 110. On the first pallet 130, a chuck 132 is mounted, on which a first workpiece $W_1$ is set up. A second pallet 140 is clamped on the table unit 50 with a rotary table 142 gripping a second workpiece $W_2$. The spindle head 80 receives a tool selected from the tool magazine 90 to machine the second workpiece $W_2$.

After machining of the second workpiece $W_2$ has been complete, the second pallet 140 is returned to the second setup station 120. First, the pallet replacing hook 126 moves forward to enter a machining area K, and at the same time, the table unit 50 performs positioning along the Y-axis linear guides 20 into a pallet replacement position (Y-axis machine origin). Next, the table unit 50 moves along the X-axis linear guides 40 to a position at which the second pallet 140 faces the second setup station 120. At this position, the linear guides 52 and the linear guides 122 face each other. This movement also brings the pallet replacing hook 126 into engagement with an engagement groove (not shown) of the second pallet 140. A clamp unit 54 turns into unclamping state, and the servo motor 124 is driven to draw the second pallet 140 off from the table unit 50 toward the second setup station 120.

After the second pallet 140 has been returned to the second setup station 120, the table unit 50 and the spindle head 80 are positioned to make a clamp unit 53 face the outlet of at least one of a coolant nozzle and an air nozzle, not shown, and chips accumulated on the clamp unit 53 are washed off using coolant. Next, the table unit 50 moves to make the linear guides 51 face the linear guides 112 of the first setup station 110. The servo motor 114 is driven to urge the first pallet 130 onto the table unit 50, and the clamp unit 53 turns into clamping state to secure the first pallet 130 onto the table unit 50. Next, the table unit 50 moves in the X axis direction to bring the pallet replacing hook 116 out of engagement with the engagement groove of the first pallet 130, and then the pallet replacing hook 116 is returned toward the first setup station 110. When these pallet replacement operations end, the table unit 50 moves to a position at which the first workpiece $W_1$ faces the spindle head 80, as shown in FIG. 2, and undergoes intended machining by the spindle head 80.

Figure 6:
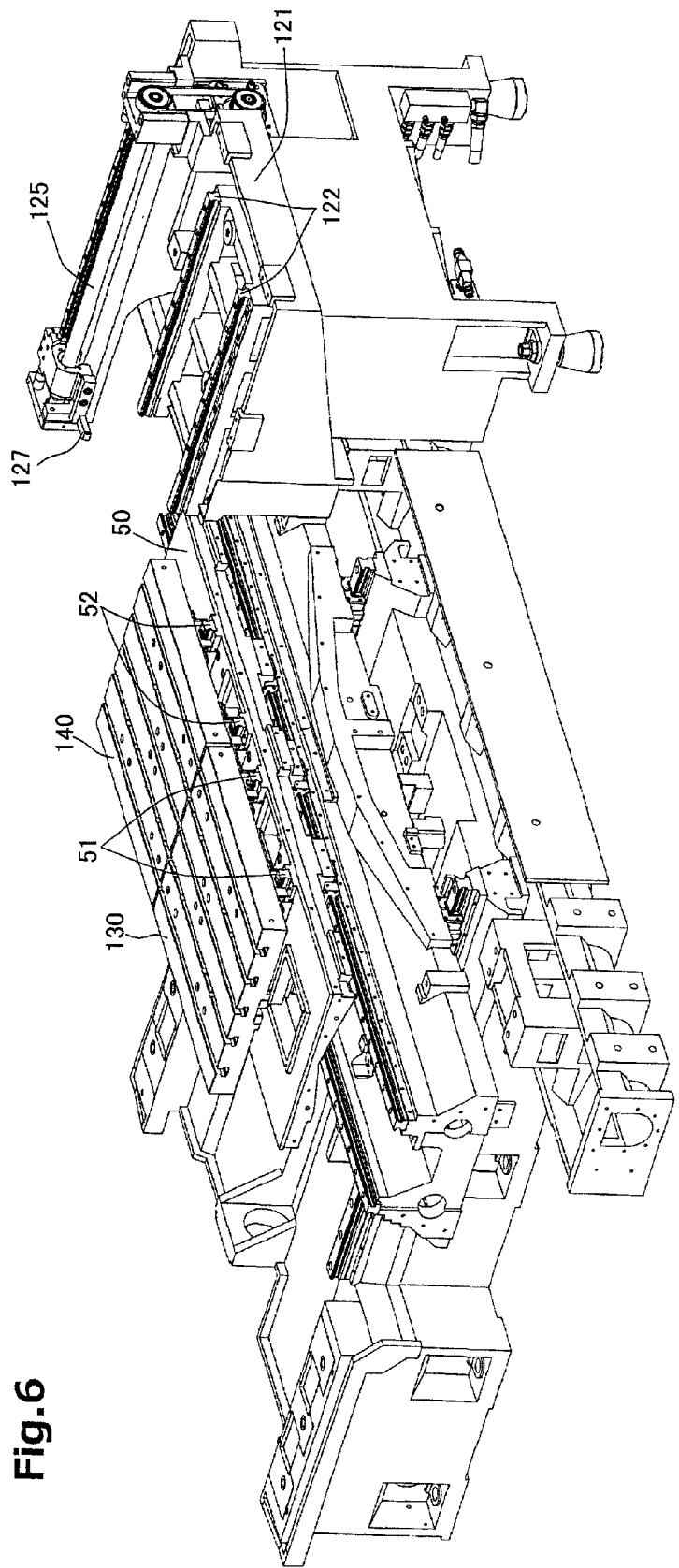
FIG. 6 illustrates replacement of a pallet according to the present invention.
Figure 7:
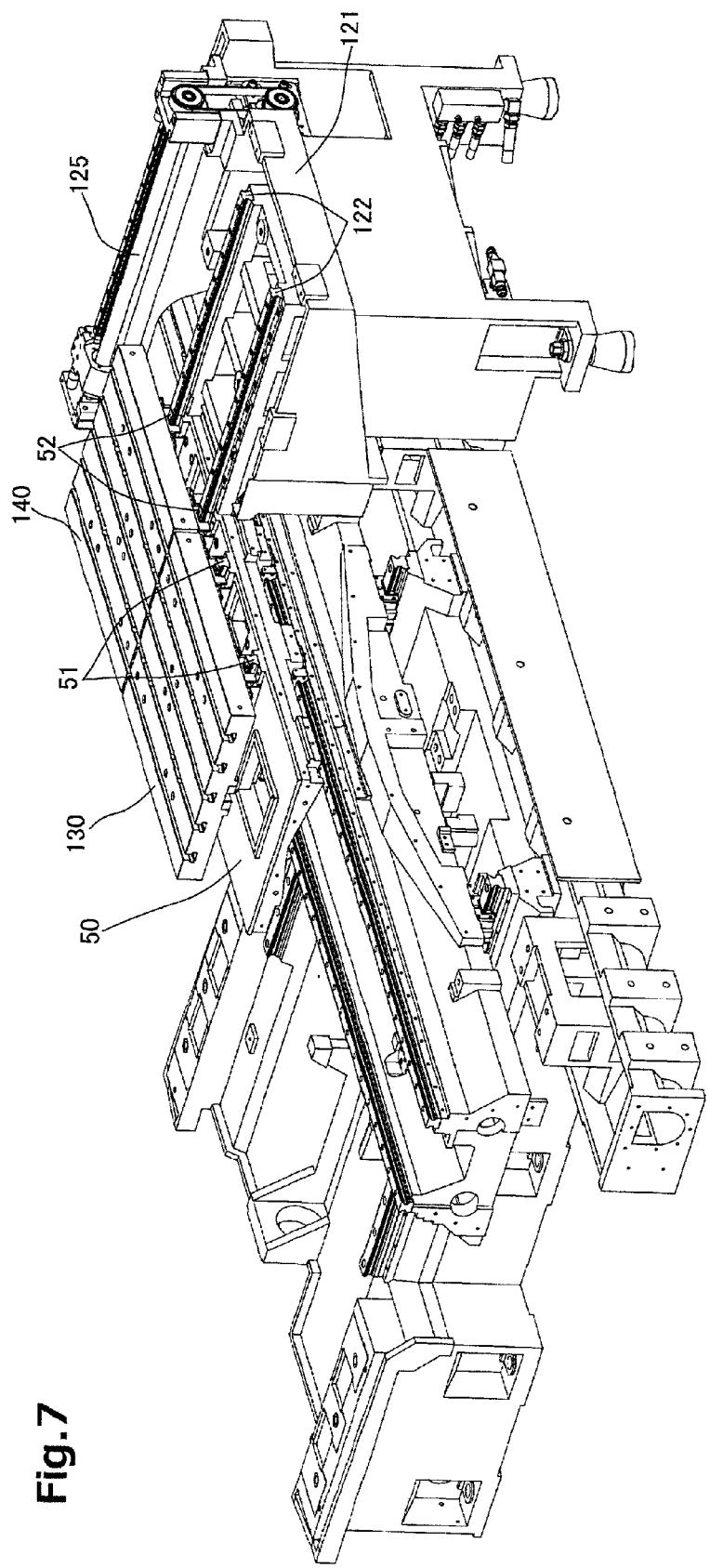
FIG. 7 illustrates replacement of a pallet according to the present invention.
Figure 8:
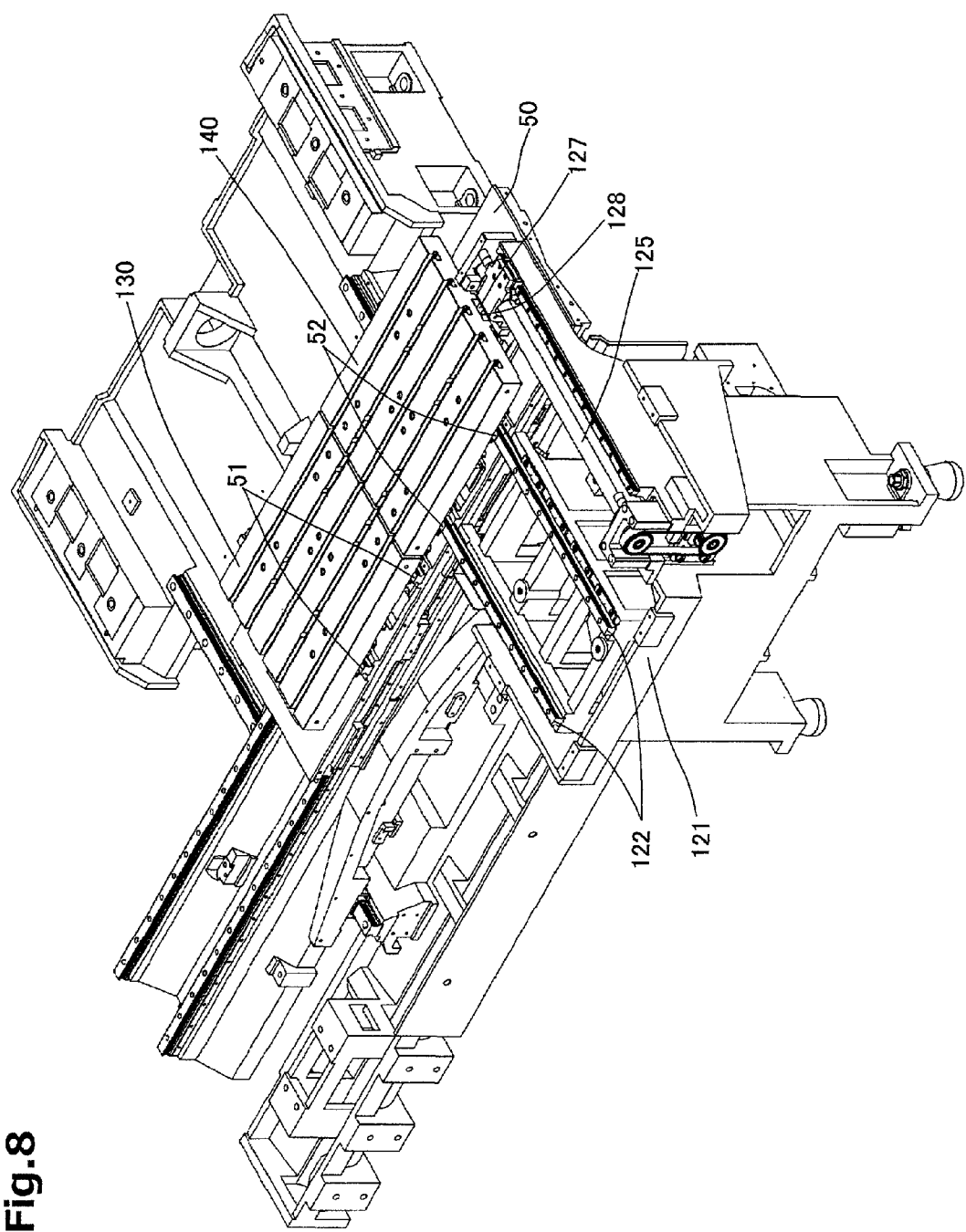
FIG. 8 illustrates replacement of a pallet according to the present invention.

FIGS. 6, 7, and 8 illustrate a detailed positional relationship between a setup station, which is the second setup station here, and the table unit at the time of a pallet replacement operation. Elements that are partially different in shape from those in the above-described embodiment will be designated different reference numerals. Also, elements that are deemed unnecessary for description of actions are not shown for convenience purposes. FIG. 6 illustrates a state in which the second pallet 140 is intended to move from the table unit 50 to a second setup station 121, and for this purpose, the table unit 50 is moving along the X axis toward the pallet replacement position at the Y-axis machine origin (the pallet replacement position of the Y axis), or a state in which the second pallet 140 has been moved onto the table unit 50 from the second setup station 121, and the X axis is apart from the pallet replacement position. FIGS. 7 and 8 illustrate, from different angles, a state at the start of movement of the second pallet 140 from the table unit 50 to the second setup station 121, or a state at the completion of movement of the second pallet 140 from the second setup station 121 to the table unit 50. A pallet replacing hook 127 enters the machining area K and, at the forward end position, is brought into or out of engagement with an engagement groove 128 of the second pallet 140 on the table unit 50. The pallet replacing hook 127 engaged with the second pallet 140 draws the second pallet 140 off along the linear guides 52 and the linear guides 122 onto the second setup station 121, and stops at the rear end. While the pallet replacing hook 127 is at rest, the movement of the pallet 140 is restricted and thus there is no need for an additional brake mechanism at the setup station. The pallet replacing hook 127 shown in FIGS. 6 and 8 is at the forward end position. The pallet replacing hook 127 engages or disengages with the second pallet 140 by the movement of the table unit 50 along the X axis. As shown in FIGS. 7 and 8, the linear guides 52 on the table unit 50 and the linear guides 122 on the second setup station 121 are accurately aligned with each other in the Y axis direction at the pallet replacement position. At the time when the table unit 50 is positioned at the pallet replacement position along the X axis, the space between the linear guides 52 and the linear guides 122 is set at 1 mm in actual practice. In this respect, the opposing end surfaces of the linear guides 52 and the linear guides 122 are chamfered to a predetermined dimension. Additionally, both side surfaces of each linear guide are tapered by 0.5 mm per 100 mm. These kinds of treatment ensure no or minimal hindrance to the actions moving back and forth between the two pairs of linear guides.

Figure 3:
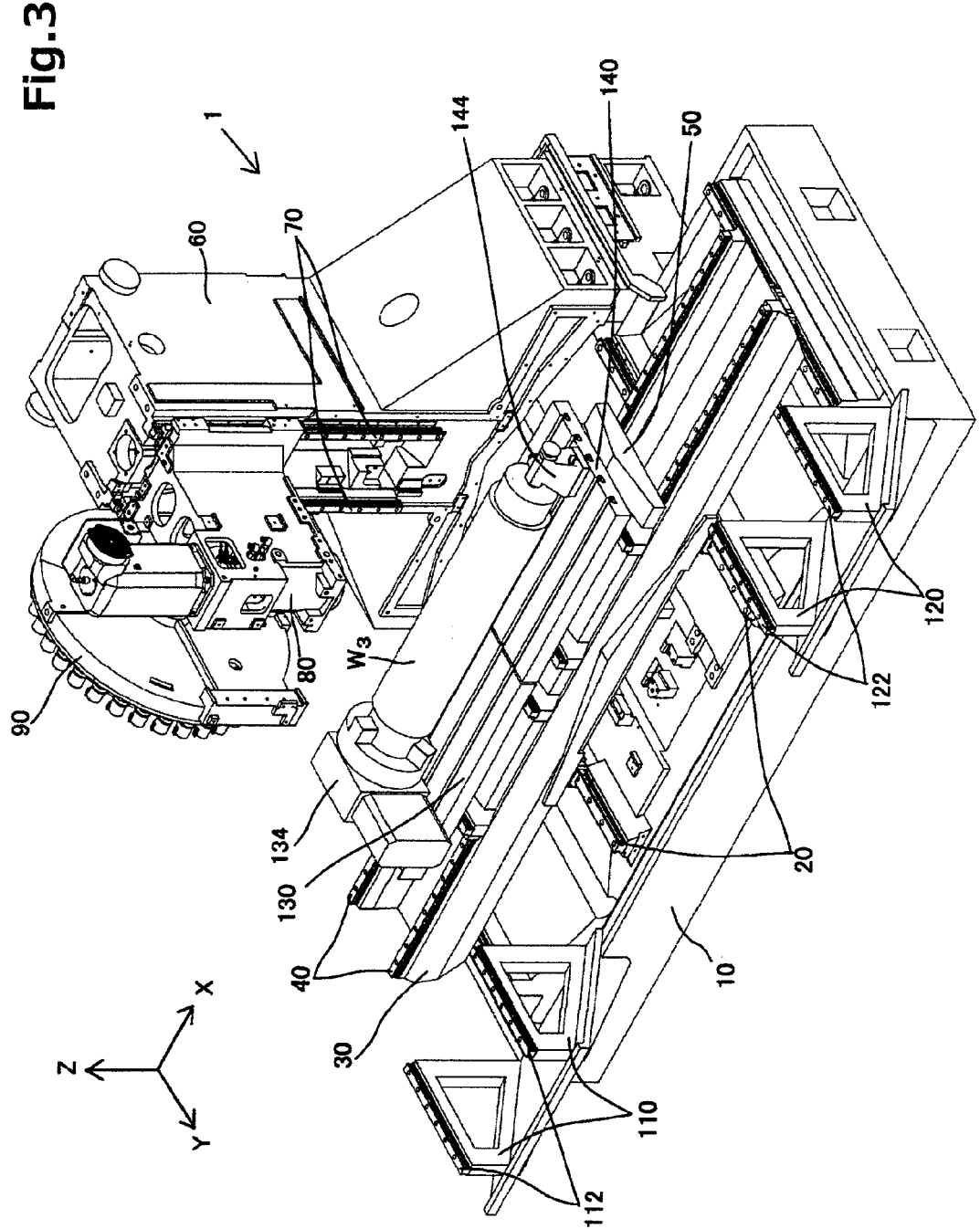
FIG. 3 illustrates a long round workpiece being machined.

FIG. 3 illustrates a long round workpiece $W_3$ being machined on the bed 10. The first pallet 130 and the second pallet 140 are clamped onto the table unit 50. A rotary table 134 is mounted on the first pallet 130, and a tail stock 144 is mounted on the second pallet 140. Thus, clamping two pallets onto the table unit 50 ensures machining of a long workpiece. This eliminates the need for an additional pallet dedicated to a long workpiece, which is effective especially in applications where long workpieces are machined significantly infrequently. At the front surface of the bed 10, a large space of width $L_1$ is defined between the first setup station 110 and the second setup station 120. This width is larger than a length $L_2$, which is the length in the X axis direction of the two pallets 130 and 140 disposed on the table unit 50. The width $L_1$ space is utilized to facilitate setup of the long workpiece $W_3$ onto the first pallet 130 and the second pallet 140.

Figure 4:
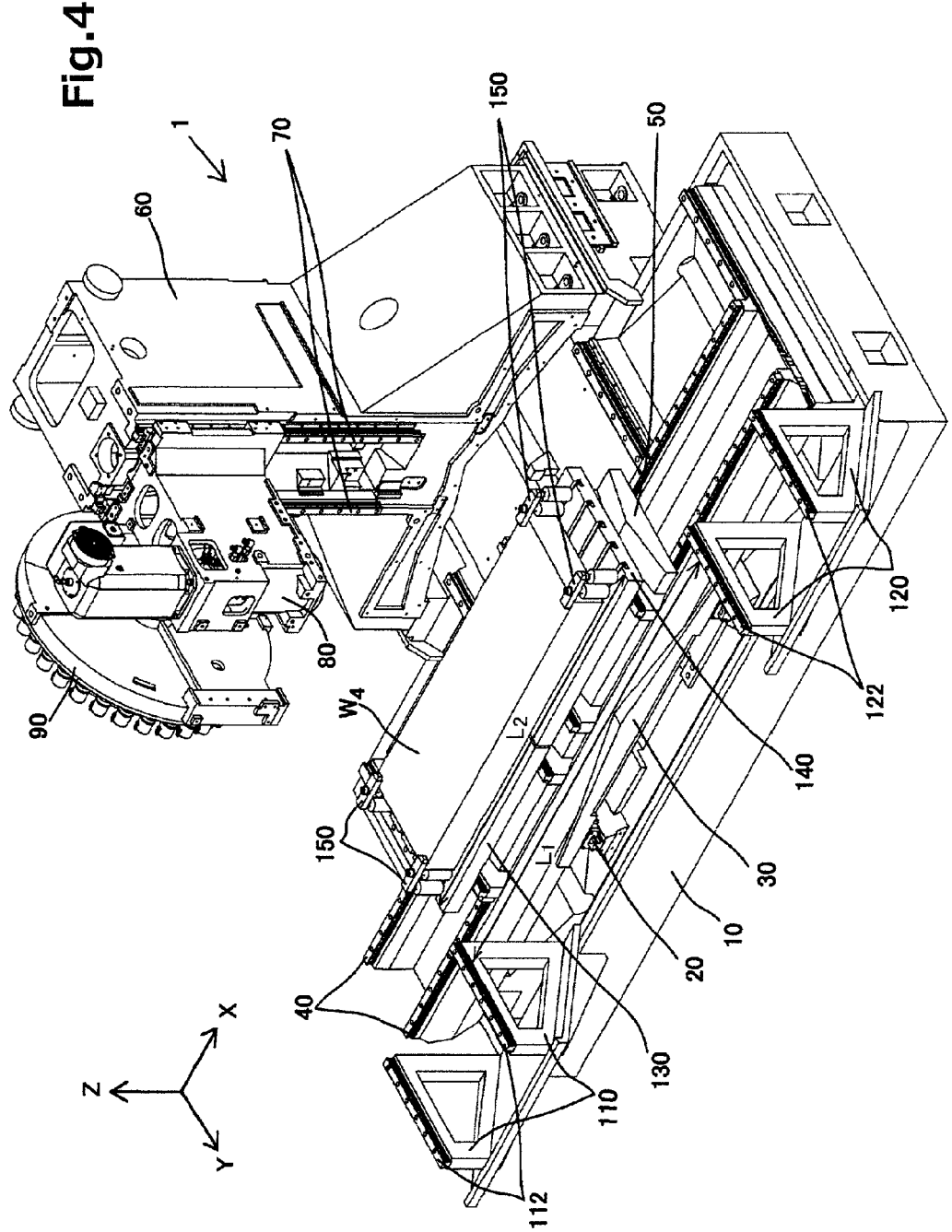
FIG. 4 illustrates a long square workpiece being machined.

FIG. 4 illustrates a long square workpiece $W_4$ being machined on the bed 10. The workpiece $W_4$ is clamped onto the first pallet 130 and the second pallet 140 using four securing jigs 150. As described above by referring to FIG. 3, the large space at the front surface of the bed 10 between the first setup station 110 and the second setup station 120 is utilized to facilitate setup of the long workpiece $W_4$. It should be noted that while the first pallet 130 and the second pallet 140 have been illustrated as being disposed next to one another on the table unit 50, the space between these pallets may not necessarily be zero or at minimum. Rather, some distance is preferably secured between the two pallets so as to avoid intervention of chips or other substance at the time of mounting of the two pallets. Specifically, the distance is approximately 10 mm to 100 mm.

Figure 5:
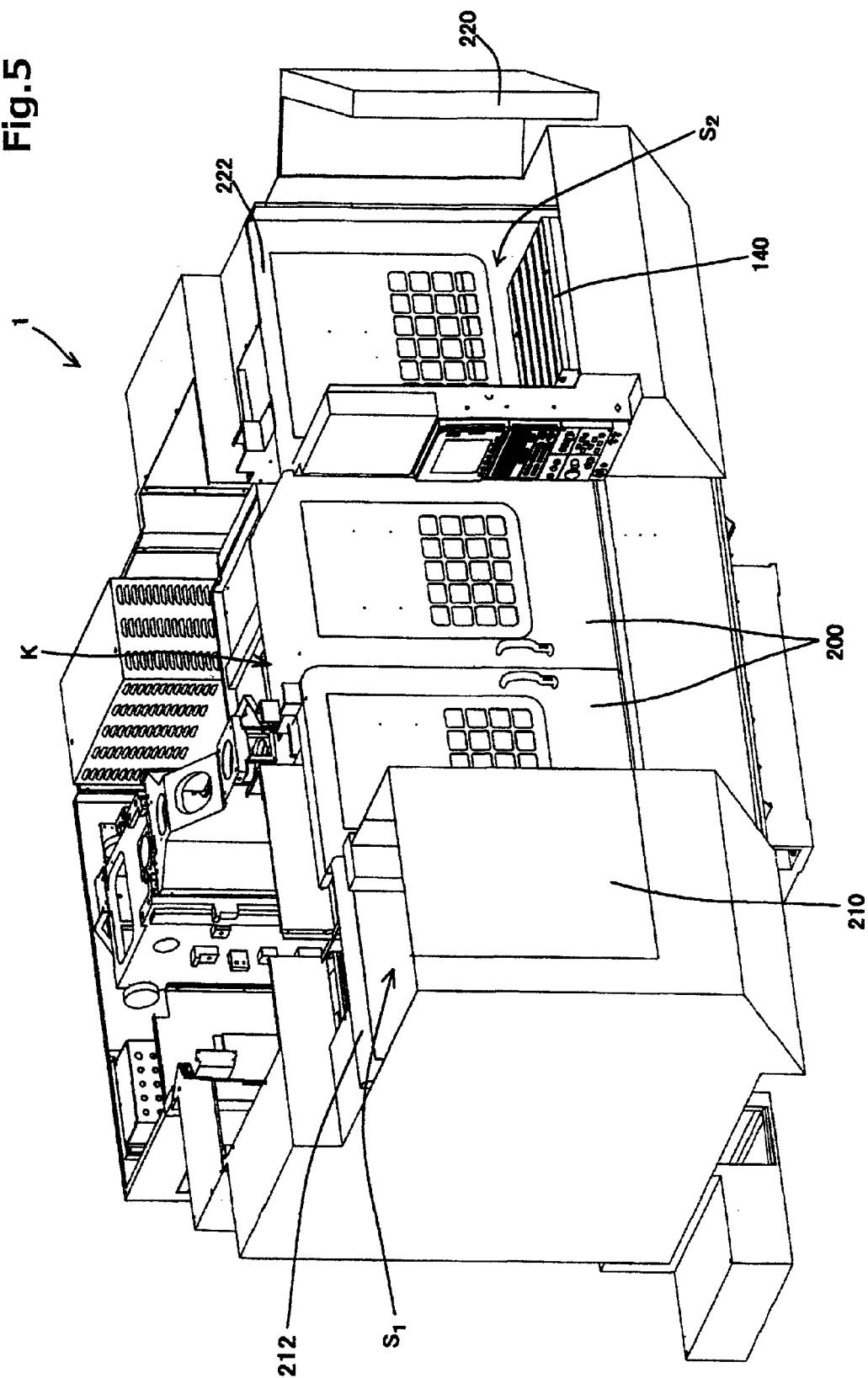
FIG. 5 illustrates a machine configuration of the machining center according to the present invention covered with a cover.

FIG. 5 illustrates a machine configuration of the machining center 1 covered with a cover. A main door 200 provides access to the machining area K. To the left of the main door 200, a first setup station door 210 is disposed to provide access to a first setup station area $S_1$. A first partition door 212 opens and closes the first setup station area $S_1$ relative to the machining area K. Closing the partition door 212 ensures setup on the first pallet 130 even during machining in the machining area K. To the right of the main door 200, a second setup station door 220 is disposed to provide access to a second setup station area S$_2$. A second partition door 222 opens and closes the second setup station area S$_2$ relative to the machining area K. Closing the partition door 222 ensures setup on the second pallet 140 even during machining in the machining area K.

As has been described hereinbefore, for a workpiece that is sized and machinable within a single pallet, the first pallet 130 and the second pallet 140 may be used separately in machining This ensures setup work of the workpiece next to be machined without discontinuing the automatic operation. The continued automatic operation ensures high productivity. A long workpiece can also be dealt with by clamping the first pallet 130 and the second pallet 140 onto the table unit 50. In this case, a space greater than the length of the two pallets combined is defined between the first setup station and the second setup station at the front surface of the machine. This facilitates machining of a long workpiece. The width of the machine is approximately four times the width of the pallet, which corresponds to none other than the movable range for machining for a long-application table (which has approximately twice the pallet width). Thus, the pallet replacement configuration is implemented without increasing the width of the machine. That is, a pallet replacement configuration accommodating to automatic operation and a long-pallet configuration accommodating to a long workpiece are implemented within a smaller space. Additionally, not all of the three axes are traveled by the drivingly moving spindle. Instead, the horizontal two axes are traveled by the drivingly moving table, which is smaller in weight and in the number of controlled objects. This ensures a simpler configuration and lower cost production than production of the spindle moving type. Additionally, the pallet replacing mechanism employs a simple mechanism with only linear guides and a replacing hook. The only driving device is the replacing hook, and this reduces the failure frequency and facilitates maintenance. Additionally, the two pairs of linear guides, which are the linear guides disposed on the table unit and the linear guides that are opposed to the foregoing linear guides and disposed on a setup station, are chamfered on the end surface of each linear guide and tapered on both side surfaces of each linear guide. This ensures smooth transfer of the pallet between the two pairs of linear guides.

It should be noted that while the pallet replacing hooks 116 and 126 have been illustrated as being driven by the servo motors 114 and 124 and the ball screws 115 and 125, it is also possible to use a hydraulic or pneumatic cylinder and piston or a rack and pinion.

DESCRIPTION OF THE REFERENCE NUMERAL

1 Machining center
10 Bed
20 Y-axis linear guide
30 Saddle
40 X-axis linear guide
50 Table unit
51 Linear guide
52 Linear guide
53 Clamp unit
54 Clamp unit
60 Column
70 Z-axis linear guide
80 Spindle head
90 Tool magazine
110 First setup station
112 Linear guide
114 Servo motor
115 Ball screw
116 Pallet replacing hook
120 Second setup station
121 Second setup station
122 Linear guide
124 Servo motor
125 Ball screw
126 Pallet replacing hook
127 Pallet replacing hook
128 Engagement groove
130 First pallet
132 Chuck
134 Rotary table
140 Second pallet
142 Rotary table
144 Tail stock
150 Securing jig
200 Main door
210 First setup station door
212 First partition door
220 Second setup station door
222 Second partition door
K Machining area
S$_1$ First setup station area
S$_2$ Second setup station area

The invention claimed is:

1. A machining center comprising:
a bed;
a column disposed upright at a rear center portion of the bed;
a table unit mounted on the bed and configured to move along a horizontal X axis and a horizontal Y axis orthogonal to the X axis;
a spindle mounted at a front surface of the column and configured to move along a vertical Z axis so as to machine a first workpiece or a second workpiece longer than the first workpiece;
a first pallet and a second pallet;
a first clamp unit configured to clamp the first pallet onto the table unit;
a second clamp unit configured to clamp the second pallet next to the first pallet on the table unit;
a first setup station disposed at a left end, with respect to the center portion of the bed when the bed is viewed from a point of view directly in front of the center portion of the bed, of a front surface of the bed, the first setup station being where the first workpiece is to be set up onto the first pallet;
a second setup station disposed at a right end, with respect to the center portion of the bed when the bed is viewed from a point of view directly in front of the center portion of the bed, of the front surface of the bed with a space defined between the first setup station and the second setup station, the second setup station being where a different first workpiece, also shorter than the second workpiece, is to be set up onto the second pallet; and
a device configured to move the first pallet between the table unit and the first setup station, and a device configured to move the second pallet between the table unit and the second setup station;

wherein in order for the machining center to machine the second workpiece, the machining center is configured to clamp the first pallet and the second pallet onto the table unit at the same time, and the space is configured to facilitate setting up of the second workpiece onto the first pallet and the second pallet, and wherein in order for the machining center to machine one of the first workpieces, the machining center is configured to selectively clamp onto the table unit one pallet at a time among the first pallet and the second pallet on which one of the first workpieces is set up.

2. The machining center according to claim 1, wherein the space, defined between the first setup station and the second setup station, comprises a width in the X direction that is larger than a length in an X axis direction of both the first pallet and the second pallet when both the first pallet is clamped by the first clamp unit and when the second pallet is additionally clamped by the second clamp unit on the table unit.

3. The machining center according to claim 2, further comprising:

a main door disposed in front of the space so as to provide access to a machining area where the table unit is disposed;

a first setup station door disposed at a front surface of the first setup station so as to provide access to a first setup station area where the first setup station is disposed; and a second setup station door disposed at a front surface of the second setup station so as to provide access to a second setup station area where the second setup station is disposed.

4. The machining center according to claim 3, further comprising:

a first partition door configured to open and close the first setup station area relative to the machining area; and a second partition door configured to open and close the second setup station area relative to the machining area.

5. The machining center according to claim 1, further comprising:

a main door disposed in front of the space so as to provide access to a machining area where the table unit is disposed;

a first setup station door disposed at a front surface of the first setup station so as to provide access to a first setup station area where the first setup station is disposed; and a second setup station door disposed at a front surface of the second setup station so as to provide access to a second setup station area where the second setup station is disposed.

6. The machining center according to claim 5, further comprising:

a first partition door configured to open and close the first setup station area relative to the machining area; and a second partition door configured to open and close the second setup station area relative to the machining area.

* * * * *